United States Patent
Haerr et al.

(10) Patent No.: US 6,547,048 B2
(45) Date of Patent: Apr. 15, 2003

(54) MANUAL BRAKING SYSTEM WITH HYDRAULIC BRAKE BOOSTER

(75) Inventors: Timothy A. Haerr, Enon, OH (US); Gary C. Fulks, Spring Valley, OH (US)

(73) Assignee: Delphi Technologies, Inc., Troy, MI (US)

( * ) Notice: Subject to any disclaimer, the term of this patent is extended or adjusted under 35 U.S.C. 154(b) by 28 days.

(21) Appl. No.: 09/846,656

(22) Filed: May 1, 2001

(65) Prior Publication Data

US 2002/0162715 A1 Nov. 7, 2002

(51) Int. Cl.$^7$ .............................. B60T 11/00; B60T 8/88
(52) U.S. Cl. .................. 188/359; 303/122.09; 303/9.72
(58) Field of Search ............................. 303/9.72, 9.73, 303/122.09, 122.15; 188/345, 358, 359; 60/565; 91/535

(56) References Cited

U.S. PATENT DOCUMENTS

| | | | | |
|---|---|---|---|---|
| 4,818,039 A | * | 4/1989 | Bertling et al. ............. 180/197 |
| 4,826,257 A | * | 5/1989 | Burckhardt et al. ........ 303/186 |
| 5,048,397 A | * | 9/1991 | Cooney ....................... 60/563 |
| 5,088,800 A | * | 2/1992 | Holzmann ................ 303/113.5 |
| 5,123,713 A | * | 6/1992 | Steiner .................... 303/113.4 |
| 5,125,724 A | * | 6/1992 | Steiner .................... 303/113.2 |
| 5,259,195 A | * | 11/1993 | Pringle ......................... 303/62 |
| 5,480,222 A | * | 1/1996 | Cooney ...................... 188/358 |
| 5,577,384 A | * | 11/1996 | Watanabe et al. ....... 303/122.09 |
| 5,794,739 A | * | 8/1998 | Ring et al. ............. 188/153 R |
| 5,954,406 A | * | 9/1999 | Sawada ........................ 303/10 |

\* cited by examiner

Primary Examiner—Douglas C. Butler
Assistant Examiner—Robert A. Siconolfi
(74) Attorney, Agent, or Firm—Scott A. McBain

(57) ABSTRACT

A hydraulic pressure intensifier for operating a vehicle braking system under conditions that are not conducive to the proper operation of a power assist for the braking system. The hydraulic pressure intensifier has an intensifier inlet fluidly connected to a master cylinder and an intensifier outlet fluidly connected to a wheel cylinder. A bypass valve has an input and output fluidly connected to the intensifier inlet and the intensifier outlet, respectively. With normal power assisted braking operation, the bypass valve is open and the master cylinder is fluidly connected to the wheel cylinder via the bypass valve. In a manual or nonpower assisted braking operation, the bypass valve is closed; and the hydraulic pressure intensifier is fluidly connected between the master cylinder and the wheel cylinder. Thus, with the bypass valve closed, a fluid pressure from the master cylinder that is applied to the inlet of the intensifier cylinder is multiplied to a greater fluid pressure at the outlet of the intensifier cylinder and applied to the wheel cylinder.

4 Claims, 3 Drawing Sheets

MANUAL BRAKING SYSTEM WITH HYDRAULIC BRAKE BOOSTER

FIELD OF THE INVENTION

This invention relates to vehicle braking systems and more particularly, to an improved manual-braking mode.

BACKGROUND OF THE INVENTION

There is a continuing effort to improve the performance of vehicle braking systems in both the powered and unpowered mode. Power or power assisted braking often uses a fluid pressure actuator such as a vacuum booster to boost the driver-exerted force on the brake pedal. Such a known power braking system 18 is schematically illustrated in FIG. 2. Depressing a brake pedal 20 moves a pushrod 22 to the right as illustrated in FIG. 2. The pushrod is connected to a piston rod (not shown) in a master cylinder 24 in a known manner. The pushrod 22 extends through a vacuum booster 26 that contains a diaphragm 28 mechanically connected to the pushrod 22. The diaphragm 28 separates and seals a forward fluid chamber 36 from a rear fluid chamber 38. The forward fluid chamber 36 is connected to the vehicle vacuum system 30, and the rear fluid chamber 38 is vented to atmosphere via a port 32. As the operator pushes the brake pedal 20, the pushrod 22 operates a control valve (not shown) in a known manner to open the forward chamber 36 to the vacuum system 30. Thus, atmospheric pressure in the rearward chamber 38 applies a substantial force on the diaphragm 28, which translates with the pushrod 22. Thus, the vacuum booster 26 provides a substantial additive force to the force supplied by the operator on the brake pedal 20.

Known master cylinders 24 have primary and secondary cylinder portions that are operated simultaneously and in parallel in response to the translation of the pushrod 22. Therefore, the master cylinder 24 provides two independently operable fluid pressure outlets 40, 42. Hydraulic fluid from the first output is fluidly connected to a first pair of the wheel cylinders 44, 46, and hydraulic fluid from the second master cylinder output 42 is fluidly connected to a second pair of the wheel cylinders 48, 50. On trucks, one of the master cylinder outputs is often connected to the two front wheel cylinders, and the other master cylinder output is connected to the two rear wheel cylinders. On automobiles, each of the master cylinder outputs is normally connected to one of the front wheel cylinders and one of the rear wheel cylinders.

For proper braking operation, the master cylinder 24 must displace a volume of hydraulic fluid from each of its outputs 40, 42 that is sufficient to properly operate two of the wheel cylinders. Further, that hydraulic fluid displacement and the resulting braking force must be applied so that the vehicle is stopped in a desired distance. In one example, over a typical range of vehicle operation, it is necessary that a range of braking forces, for example, about 2000–8000 pounds, be provided by the wheel cylinders 44–50. In the absence of the vacuum booster 26, the mechanical and hydraulic systems within the braking system 18 cause the wheel cylinders 44–50 provide a braking force of about 1000 psi. Thus, the vacuum booster 26 is effective to provide an additional braking system pressure, so that the wheel cylinders 44–50 are able to supply the necessary braking forces.

While the engine is running, the vacuum system 30 generates a sufficient vacuum to provide the required power assisted braking. However, as will be appreciated, if for some reason the vacuum system 30 or vacuum booster 26 unexpectedly fail or an operator attempts to apply the brakes without the engine running, the braking system 18 loses a substantial portion of the available braking force. In the example above, when the vacuum power assist is lost, the braking system loses about 75% of its braking force. In that situation, with a limited braking force, the operator has a very difficult time bringing the vehicle to a stop within a reasonable stopping distance. Thus, there is a continuing effort to improve the braking capability of the braking system 18 in a manual-braking mode, that is, a braking mode having no power assist from the engine.

Consequently, there is a need for an improved braking system that can operate in a manual or nonpowered mode and be able to provide a substantially greater braking force than known systems.

SUMMARY OF THE INVENTION

The present invention provides a vehicle braking system having an improved vehicle braking capability when a braking power assist or boost is inoperative, which may occur either when the vehicle engine is off, or there is a failure in the power boost system, or the vehicle engine is not operating normally. Under such conditions, the vehicle braking system of the present invention provides a substantially greater braking force in response to a force applied by an operator on a brake pedal. Thus, the vehicle braking system of the present invention substantially improves the operator's capability of stopping the vehicle in a shorter time and over a shorter distance under nonpower assist conditions.

According to the principles of the present invention and in accordance with the preferred embodiments, the invention provides an apparatus for use with a vehicle braking system having a brake pedal adapted to be used by an operator. A pushrod has one end connected to the brake pedal and an opposite end connected to a master cylinder. A hydraulic pressure intensifier has an intensifier inlet fluidly connected to the master cylinder and an intensifier outlet fluidly connected to a wheel cylinder. A bypass valve has an input and output fluidly connected to the intensifier inlet and the intensifier outlet, respectively. The bypass valve has an open state that fluidly connects the master cylinder to the wheel cylinder via the bypass valve, and a closed state that fluidly connects the hydraulic pressure intensifier between the master cylinder and the wheel cylinder. Thus, a fluid pressure from the master cylinder that is applied to the inlet of the intensifier cylinder is multiplied to a greater fluid pressure at the outlet of the intensifier cylinder and applied to the wheel cylinder.

In one aspect of the invention, the hydraulic pressure intensifier includes an intensifier cylinder with a larger cross-sectional area adjacent the intensifier inlet and a smaller cross-sectional area adjacent the intensifier outlet, and an intensifier piston having a larger cross-sectional area disposed in the larger cross-sectional area of the intensifier cylinder and a smaller cross-sectional area disposed in the smaller cross-sectional area of the intensifier cylinder.

In another aspect of the invention, hydraulic pressure intensifier includes a bypass valve actuator that may be implemented with a pressure sensor fluidly connected to a vacuum system. The pressure sensor provides an output signal having a first signal state in response to a lower pressure in the vacuum system for opening the bypass valve and a second signal state in response to a higher pressure in the vacuum system for closing the bypass valve.

In another embodiment of the invention, a method is provided for operating a vehicle braking system with a power assist with the above described pressure intensifier.

These and other objects and advantages of the present invention will become more readily apparent during the following detailed description taken in conjunction with the drawings herein.

DETAILED DESCRIPTION OF THE INVENTION

Figure 1A:
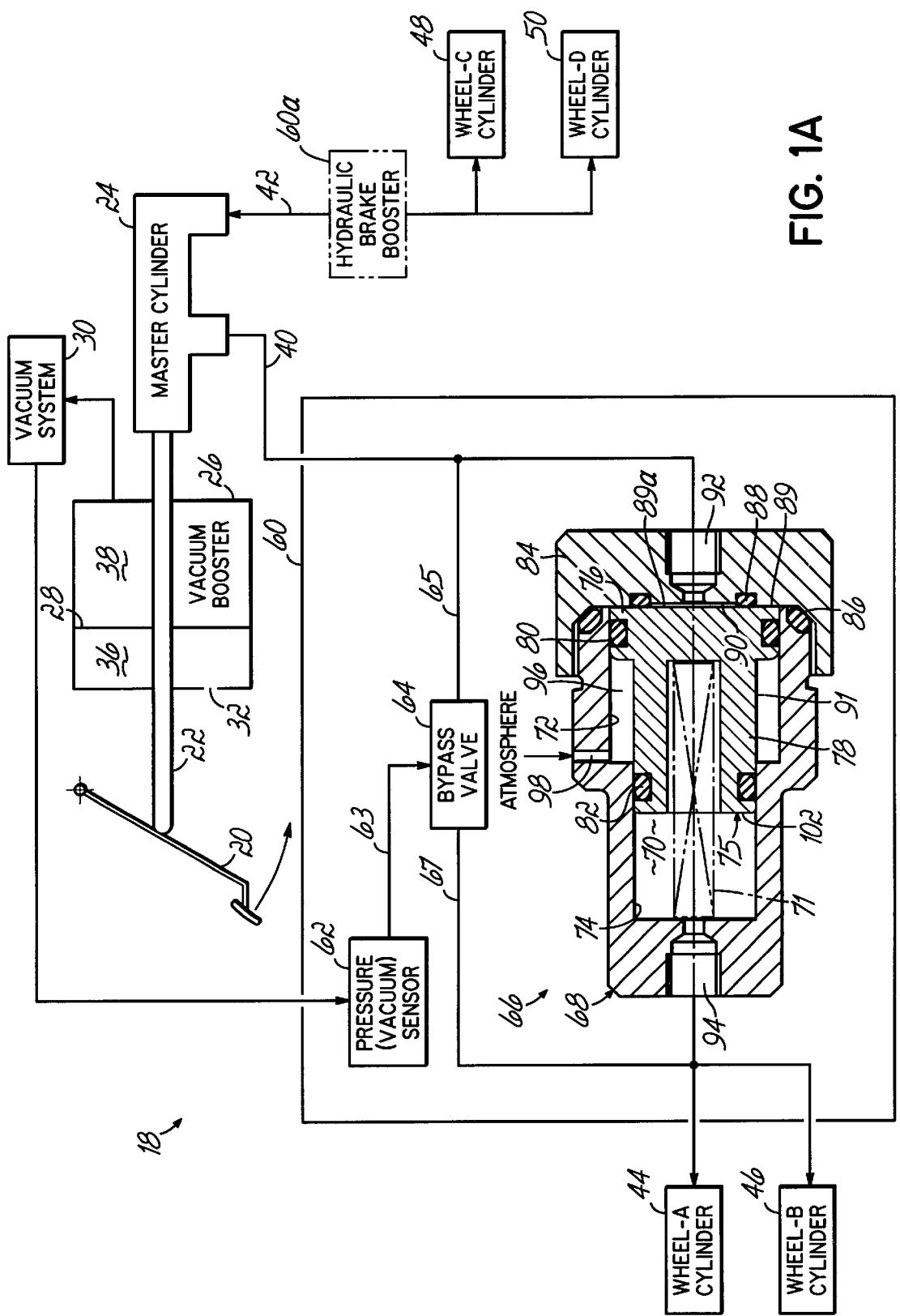
FIG. 1A is a schematic block diagram of a vehicle braking circuit that includes a hydraulic brake booster for use in the manual mode in accordance with the principles of the present invention.

Referring to FIG. 1, a hydraulic brake booster 60 is inserted in the vehicle braking system 18 between one of the fluid outputs, for example, fluid output 40, of the master cylinder 24 and fluid wheel cylinders 44, 46. The hydraulic brake booster 60 is comprised of a bypass valve actuator 62, for example, a pressure or vacuum sensor, a hydraulic bypass valve 64 and a hydraulic pressure intensifier 66. The pressure sensor 62 is fluidly connected to the vacuum system 30 and provides an output 63 that is operatively connected to the bypass valve 64. The bypass valve 64 which may be, for example, an electrically operated solenoid valve, is switched between its open and closed states by changes in state of the signal on the output 63 of the pressure sensor. The bypass valve 64 has a fluid input 65 fluidly connected to the fluid output 40 of the master cylinder 24 and a fluid output 67 fluidly connected to the wheel cylinders 44, 46.

The hydraulic intensifier 66 is comprised of an intensifier cylinder 68 having a stepped bore 70 comprised of a first, larger bore 72 and a second, smaller bore 74. The first bore 72 has a cross-sectional area that is larger than the cross-sectional area of the second bore 74. A stepped piston 75 is slidably disposed within the stepped bore 70. The stepped piston 75 has an integral first, larger piston 76 that is slightly smaller than the first, larger bore 72 of the cylinder 68. The step piston 75 has an integral second smaller piston 78 that is slightly smaller than the smaller bore 74. A larger O-ring 80 provides a hydraulic fluid seal between the larger piston 76 and the larger bore 72. A smaller O-ring 82 provides a hydraulic fluid seal between the smaller piston 78 and the smaller bore 74.

After the stepped piston 75 has been disposed in the cylinder 68, a cap 84 is mounted over one end of the cylinder 68. The cap 84 is attached to the cylinder 68 by threads, adhesives, welding or other known means. An O-ring 86 is disposed between the cap 84 and the cylinder 68 to prevent hydraulic fluid from leaking therebetween. An O-ring 88 is disposed in an interior surface 90 of the cap 84. The O-ring 88 bounds a smaller area 89a on a larger, upper, end surface 89 of the stepped piston 75 that is about the same as the cross-sectional area of the smaller bore 74. It should be noted that hydraulic fluid pressure within the smaller bore 74 is determined not only by an end surface 102 of the smaller end 78 of the piston 75 but also by an annular area of O-ring 82 that is between the outer circumference of the piston smaller end 78 and the circumference of the smaller bore 74.

A biasing element 71, for example, a compression spring, biases or forces the stepped piston 75 against the O-ring 88.

The hydraulic intensifier 66 has an annular chamber 96 between a cylindrical sidewall 91 of the smaller piston 78 and the larger bore 72. The annular chamber 96 is vented to atmosphere through vent hole 98. Therefore, the stepped piston 75 is not subjected to any axial pressure forces from within the chamber 96. Further, since the area within the O-ring 88 is about equal to the cross-sectional area of the smaller piston 78, and in the power-brake mode with the bypass valve 64 open, the hydraulic pressures at the fluid inlet 92 and outlet 94 of the hydraulic intensifier 66 are about equal. Consequently, there is little or no hydraulic fluid pressure differential across the stepped piston 75. Therefore, during the power-brake mode, the biasing element 71 is operative to bias the upper surface 89 of the stepped piston 75 firmly biased against the O-ring 88 to create a hydraulic fluid seal therewith.

The hydraulic intensifier 68 has a fluid inlet 92 that is fluidly coupled to the fluid output 40 of the master cylinder 24. In addition, the hydraulic intensifier 66 has a fluid outlet 94 that is fluidly connected to fluid inputs of the wheel cylinders 44, 46 that are also commonly connected to a fluid output 67 of the bypass valve 64.

In use, the hydraulic brake booster 60 functions to provide a brake boosting force when the vehicle braking system 18 is operating in a nonpowered or manual mode. Therefore, the hydraulic brake booster 60 is inoperative when the vehicle engine is running and the vacuum booster 26 is providing a boost power-brake force. The pressure sensor 62 is fluidly connected to the vacuum system 30 and provides an output that switches between two states. The pressure sensor has a first state in response to detecting a lower, engine operating vacuum pressure within the vacuum system 30 that is provided by a normal engine operation. If the vacuum system fails, for example, through leakage, or the engine is turned off, the pressure within the vacuum system 30 rises. The pressure sensor 62 senses the higher pressure and switches to a second state.

Figure 2:
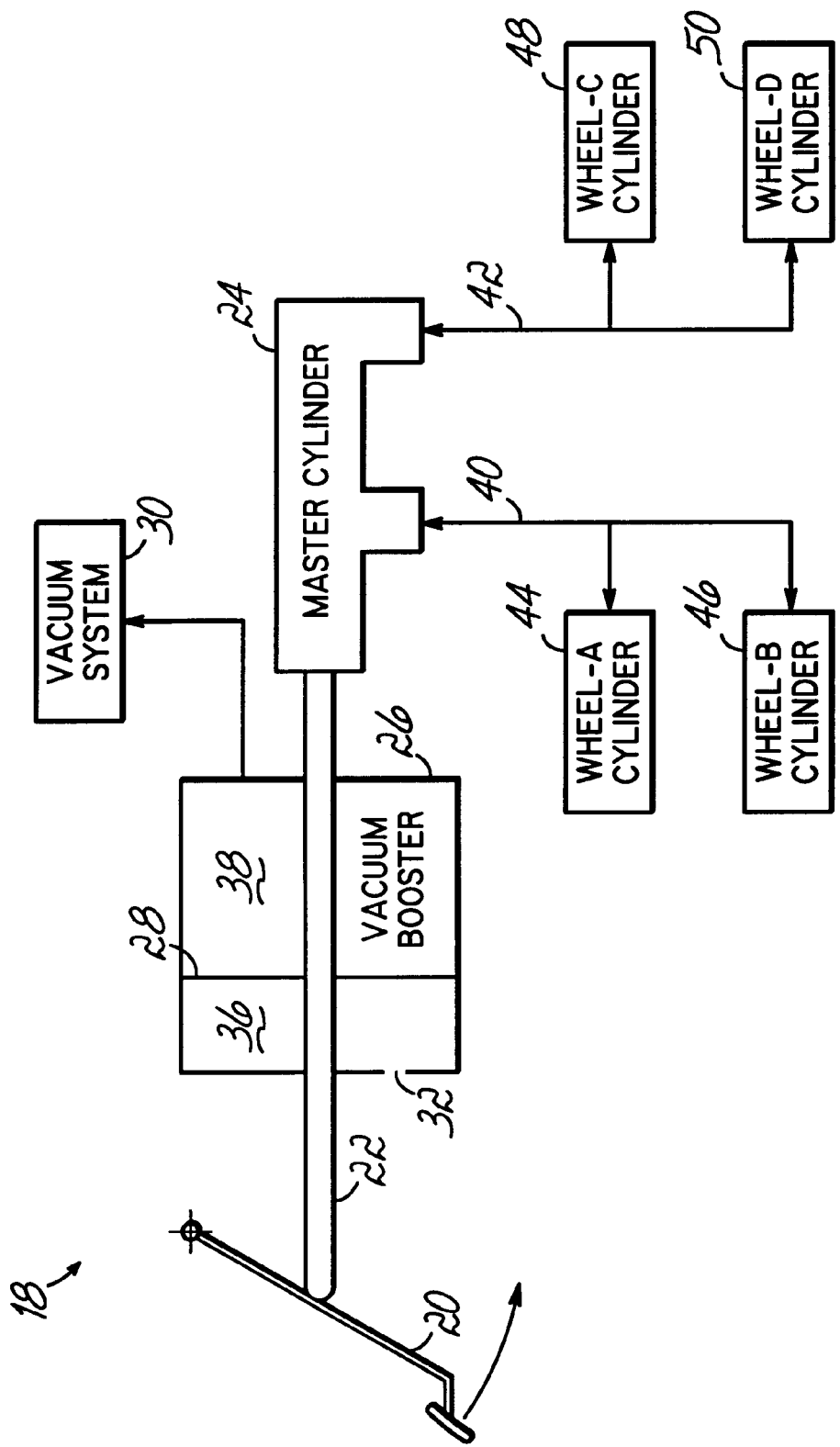
FIG. 2 is a schematic block diagram of a known vehicle braking circuit.

The bypass valve 64 is switched to its open state in response to a first state of the pressure sensor 62. In other words, when the engine is operating normally and the pressure sensor detects a lower engine operating vacuum pressure, the bypass valve 64 is open and provides a bypass hydraulic fluid path around the hydraulic intensifier 66. With the bypass valve 64 open, the master cylinder 24 has a direct fluid connection to the wheel cylinders 44, 46. Thus, when the vehicle braking system 18 is operating in the power-braking mode, the hydraulic intensifier 66 within the hydraulic brake booster 60 is inoperative; and the vehicle braking system 18 operates as was previously described with respect to the known vehicle braking system of FIG. 2.

In the event that the engine is turned off, or there is a failure in the vacuum system 30, or the engine is operating in a manner that there is insufficient vacuum pressure, the pressure differential between the pressure chambers 36, 38 of the vacuum booster disappears and the vacuum booster 26 becomes inoperative. The pressure sensor 62 within the hydraulic brake booster 60 senses an increase in pressure in the vacuum system 30 and switches the state of its output signal on line 63. The second state of the pressure sensor output signal causes the bypass valve 64 to switch to its second, closed state, thereby terminating the direct fluid connection between the master cylinder 24 and the wheel cylinders 44, 46.

Figure 1B:
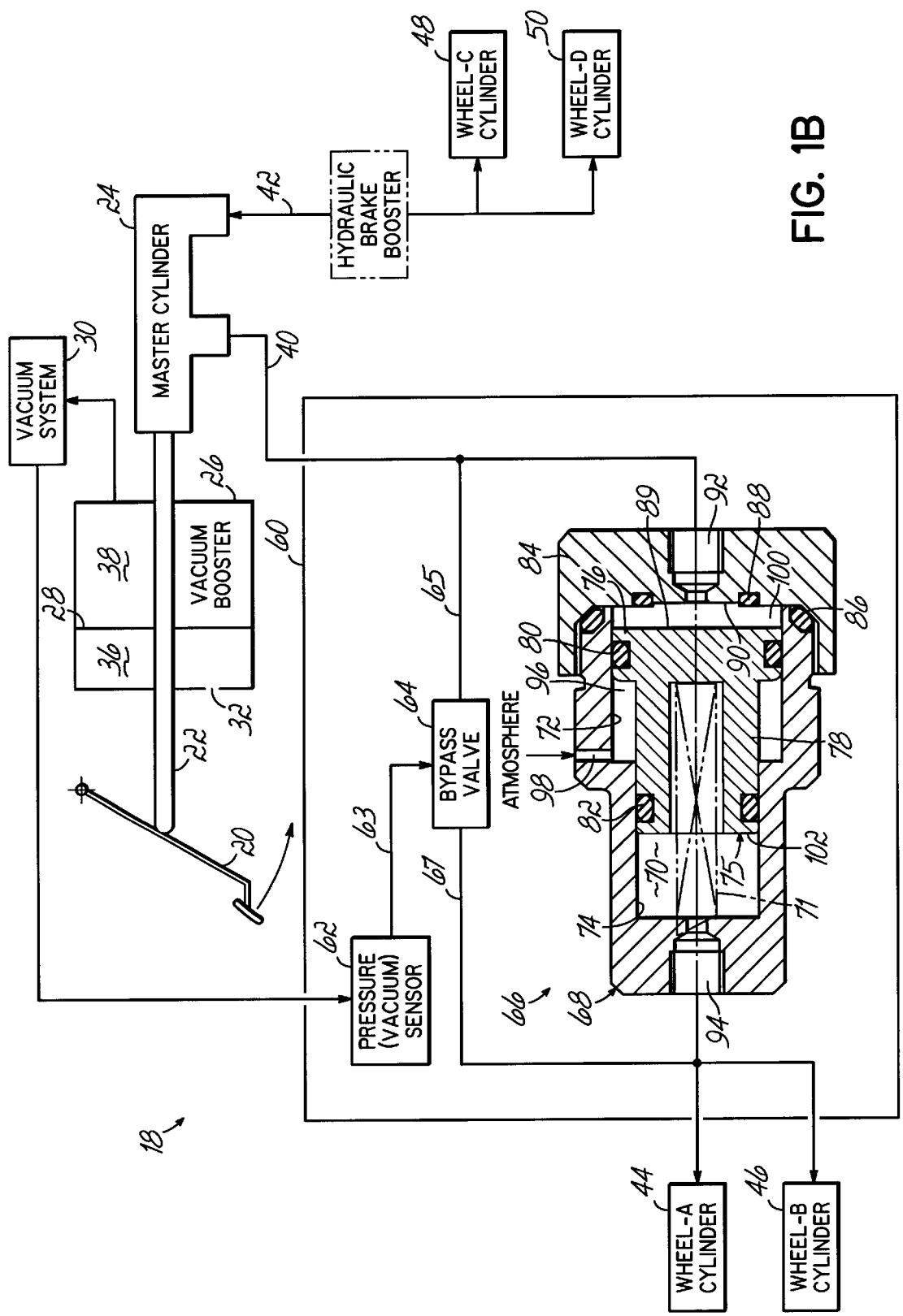
FIG. 1B is a cross-sectional view of the hydraulic intensifier of FIG. 1 showing its operation during a manual-braking mode.

With the bypass valve 64 closed, pressure builds up at the inlet 92 of the hydraulic intensifier 60. The application of a hydraulic fluid pressure on the smaller area 89a on the larger end 76 of the stepped piston 75 within the O-ring 88 creates a force that is sufficient to overcome the biasing force of the spring 71. The piston 75 then moves slightly to the left as viewed in FIG. 1A, thereby creating a larger chamber or cavity 100 between the interior surface 90 of the cap 84 and the larger end surface 89 as shown in FIG. 1B.

The formation of the inlet chamber 100 permits hydraulic fluid from the master cylinder 24 to be applied across the entire cross-sectional area of the larger bore 72. As will be appreciated, hydraulic fluid pressure is applied not only on the upper surface 89 of the piston 75 but also on an annular area of O-ring 80 that is between the outer circumference of the larger piston end 76 and the circumference of the larger bore 72. The presence of hydraulic fluid in the inlet chamber 100 results in an intensifier force being applied on the piston 75 that is equal to the mathematical product of the cross-sectional area of the larger bore 72 times the pressure of the hydraulic fluid at the fluid inlet 92 of the hydraulic intensifier 66. That intensifier force is mechanically transferred through the stepped piston 75 to the hydraulic fluid in the smaller bore 74. The intensifier force produced by the hydraulic pressure on the larger end 76 of the piston 75 when divided by the cross-sectional area of the smaller bore 74, results in a larger hydraulic fluid pressure at the fluid output 94 of the hydraulic intensifier 66 to the wheel cylinders 44, 46.

Therefore, the hydraulic intensifier 66 effectively multiplies the pressure from the master cylinder 24 to a larger magnitude as a function of the cross-sectional areas of the bores 72, 74 of the stepped bore 70. For example, if the cross-sectional area of the larger bore 72 is twice as large as the cross-sectional area of the smaller bore 74, the hydraulic intensifier 66 effectively doubles the hydraulic fluid pressure received from the master cylinder 24. In the example described previously, in the manual mode, that is, without the operation of the vacuum booster 26, when the operator depresses the brake pedal 20, the braking system provides a braking force by the wheel cylinders of about 1000 pounds. Thus, in the manual mode, with the operation of the hydraulic brake booster 60 doubling the available pressure applied to the wheel cylinders, the hydraulic intensifier 66 causes the wheel cylinders 44, 46 to provide a braking force of about 2000 pounds. It should be noted that there are fractional or minimal losses in the hydraulic intensifier 66 due to the bias spring 71 and seal friction.

As will be appreciated, the pressure multiplier effect achieved by the hydraulic intensifier 60 is dependent on the differences in the crosssectional areas of the larger and smaller bores 72, 74, respectively. Theoretically, to further increase the multiplier effect of the hydraulic intensifier 66, the cross-sectional area of the larger bore 72 can be further increased, or the cross-sectional area of the smaller bore 74 can be decreased. However, when the pressure differential across the hydraulic intensifier is increased, the volume of hydraulic fluid that must be supplied to the inlet chamber 100 also increases. For example, if the stepped piston 75 were a straight piston, there would be no pressure differential across the piston 75; and the volume of hydraulic fluid supplied to the inlet chamber 100 would be equal to the volume of fluid displaced from the outlet chamber 102. However, in the described example, the larger bore 72 has twice the cross-sectional area of the smaller bore 74; and therefore, twice the volume of hydraulic fluid will be required in the inlet chamber 100 to displace the stepped piston 75 through the outlet chamber 102 and provide the doubled hydraulic fluid pressure at the fluid output 94. To provide the increased volume of hydraulic fluid to the inlet chamber 100 requires more fluid from the master cylinder 24 and that, in turn, requires a greater stroke or displacement of the pushrod 22 and brake pedal 20. Thus, the pressure multiplying effect of the hydraulic intensifier 66 is limited by the available stroke of the pushrod 22 and brake pedal 20.

The hydraulic pressure intensifier provides a vehicle braking system having an improved braking capability when the braking power boost is inoperative, which may occur either when the vehicle engine is off, or there is a failure in the power boost system or the vehicle engine is not operating normally. Under such conditions, the hydraulic pressure intensifier provides a substantially greater braking force in response to a force applied by an operator on a brake pedal. Thus, a vehicle braking system with the hydraulic pressure intensifier substantially improves the operator's capability of stopping the vehicle in a shorter time and over a shorter distance.

While the invention has been illustrated by a description of one embodiment and while the embodiment has been described in considerable detail, there is no intention to neither restrict nor in any way limit the scope of the appended claims to such detail. Additional advantages and modifications will readily appear to those who are skilled in the art. For example, in the described embodiment, a vacuum sensor 62 is used to determine when the engine is not operating at a level sufficient to provide the necessary vacuum pressure for power braking; and the vacuum sensor 62 is used to actuate the bypass valve 64. As will be appreciated, other bypass valve actuators may be used. For example, engine speed can be sensed, and a control signal produced when the engine speed is so low that, normally, an insufficient vacuum pressure is available for the desired power braking operation. As will be appreciated, other engine operation conditions may also be sensed in order to provide a bypass valve actuator.

Further, referring to FIG. 1, the hydraulic brake booster 60 is shown providing a pressure boost to the two wheel cylinders 44, 46. As will be appreciated, in another application, it may be desirable to provide a pressure boost to the other two wheel cylinders 48, 50. In that application, a hydraulic brake booster 60a, which is identical in structure and operation to the hydraulic brake boost 60, is fluidly connected between the master cylinder 24 and wheel cylinders 48, 50.

Therefore, the invention in its broadest aspects is not limited to the specific details shown and described. Consequently, departures may be made from the details described herein without departing from the spirit and scope of the claims, which follow.

What is claimed is:

1. An apparatus for use with a vehicle braking system having a brake pedal adapted to be used by an operator, a pushrod having one end connected to the brake pedal, a master cylinder having a mechanical input connected to an opposite end of the pushrod, and at least one wheel cylinder, the braking system further including a booster connected to a vacuum system, the apparatus comprising:

a hydraulic pressure intensifier comprising an intensifier inlet adapted to be fluidly connected to an output of the master cylinder, an intensifier outlet adapted to be fluidly connected to an input of the wheel cylinder, an intensifier cylinder having a stepped internal bore with a larger end having an interior surface receiving the intensifier inlet and a smaller end adjacent the intensifier outlet, an intensifier piston having a larger end disposed in the larger end of the intensifier cylinder and a smaller end disposed in the smaller end of the intensifier cylinder, the larger end having
  a larger end face, and
  a seal contacting the larger end face when the larger end face is positioned immediately adjacent the interior surface, the seal forming an enclosed volume intersecting the intensifier inlet, the enclosed volume being bounded by the larger end face and the interior surface of the intensifier cylinder and having a cross-sectional area substantially equal to a cross-sectional area of the smaller end of the piston,
a biasing element disposed between the smaller end of the piston and the smaller end of the cylinder for biasing the intensifier piston toward the larger end of the cylinder,
a sealing ring disposed on the smaller end of piston to fluidly separate the smaller and larger ends of the intensifier cylinder, and
a vent path having one end intersecting an annular volume between the smaller end of the intensifier piston and the larger end of the intensifier cylinder, and the vent path having an opposite end extending through a wall of the intensifier cylinder;
a pressure sensor connected to the vacuum system and having an output providing
  a first state in response to a normal pressure in the vacuum system, and
  a second state in response to an abnormal pressure in the vacuum system; and
a bypass valve operatively connected to the pressure sensor, the bypass valve having an input fluidly connected to an output of the master cylinder and the intensifier inlet and an output fluidly connected to the wheel cylinder and the intensifier outlet, the bypass valve having
  an open state for fluidly connecting the master cylinder to the wheel cylinder via the bypass valve in response to the first state of the output of the pressure sensor, and
  a closed state fluidly connecting the hydraulic pressure intensifier between the master cylinder and the wheel cylinder in response to the second state of the output of the pressure sensor, whereby a fluid pressure from the master cylinder applied to the inlet of the intensifier cylinder is multiplied to a greater fluid pressure at the outlet of the intensifier cylinder and applied to the wheel cylinder.

2. The apparatus of claim 1 wherein the hydraulic pressure intensifier further comprises a sealing ring disposed on the larger end of the intensifier piston to provide a fluid seal between the larger end of the intensifier piston and the larger end of the intensifier cylinder.

3. A hydraulic pressure intensifier comprising:
an intensifier inlet;
an intensifier outlet;
an intensifier cylinder having a stepped internal bore with a larger end having an interior surface receiving the intensifier inlet and a smaller end adjacent the intensifier outlet;
an intensifier piston having a larger end disposed in the larger end of the intensifier cylinder and a smaller end disposed in the smaller end of the intensifier cylinder, the larger end having
  a larger end face,
  a seal contacting the larger end face when the larger end face is positioned immediately adjacent the interior surface, the seal forming an enclosed volume intersecting the intensifier inlet, the enclosed volume being bounded by the larger end face and the interior surface of the intensifier cylinder and having a cross-sectional area substantially equal to a cross-sectional area of the smaller end of the piston;
a biasing element disposed between the smaller end of the piston and the smaller end of the cylinder for biasing the intensifier piston toward the larger end of the cylinder;
a sealing ring disposed on the smaller end of piston to fluidly separate the smaller and larger ends of the intensifier cylinder; and
a vent path having one end intersecting an annular volume between the smaller end of the intensifier piston and the larger end of the intensifier cylinder, and the vent path having an opposite end extending through a wall of the intensifier cylinder.

4. The apparatus of claim 3 wherein the hydraulic pressure intensifier further comprises a sealing ring disposed on the larger end of the intensifier piston to provide a fluid seal between the larger end of the intensifier piston and the larger end of the intensifier cylinder.

* * * * *